(12) United States Patent
Coccia et al.

(10) Patent No.: US 9,257,848 B2
(45) Date of Patent: Feb. 9, 2016

(54) METHOD FOR CONTROLLING SINGLE-PHASE DC/AC CONVERTERS AND CONVERTER ARRANGEMENT

(75) Inventors: Antonio Coccia, Zurich (CH); Francisco Canales, Zurich (CH); Leonardo-Augusto Serpa, Zurich (CH); Mikko Paakkinen, Zurich (CH)

(73) Assignee: ABB RESEARCH LTD., Zurich (CH)

( * ) Notice: Subject to any disclaimer, the term of this patent is extended or adjusted under 35 U.S.C. 154(b) by 1347 days.

(21) Appl. No.: 12/732,871

(22) Filed: Mar. 26, 2010

(65) Prior Publication Data
US 2010/0244575 A1 Sep. 30, 2010

(30) Foreign Application Priority Data

Mar. 26, 2009 (EP) .................................... 09156258

(51) Int. Cl.
| | |
|---|---|
| H02J 5/00 | (2006.01) |
| H02J 3/38 | (2006.01) |
| H02M 7/48 | (2007.01) |
| H02M 7/49 | (2007.01) |

(52) U.S. Cl.
CPC .............. *H02J 3/383* (2013.01); *H02J 5/005* (2013.01); *H02M 7/4807* (2013.01); *H02M 7/49* (2013.01); *Y02E 10/563* (2013.01); *Y10T 307/707* (2015.04)

(58) Field of Classification Search
CPC ....................................................... H02J 5/005
USPC ........................................................... 307/82
See application file for complete search history.

(56) References Cited

U.S. PATENT DOCUMENTS

| | | | | | |
|---|---|---|---|---|---|
| 4,052,657 | A | * | 10/1977 | Kleiner et al. .................. 363/43 |
| 5,949,668 | A | * | 9/1999 | Schweighofer ................ 363/71 |
| 6,005,788 | A | * | 12/1999 | Lipo et al. ....................... 363/71 |
| 6,031,746 | A | * | 2/2000 | Steigerwald et al. ........... 363/71 |
| 6,058,032 | A | * | 5/2000 | Yamanaka et al. .............. 363/71 |
| 6,556,461 | B1 | * | 4/2003 | Khersonsky et al. ........... 363/41 |
| 6,697,271 | B2 | * | 2/2004 | Corzine .......................... 363/71 |
| 6,867,987 | B2 | * | 3/2005 | Cheng et al. .................... 363/43 |
| 6,969,967 | B2 | * | 11/2005 | Su .................................. 318/801 |
| 6,979,916 | B2 | * | 12/2005 | Schienbein et al. ............ 307/82 |
| 7,050,311 | B2 | * | 5/2006 | Lai et al. ......................... 363/37 |
| 7,116,166 | B2 | * | 10/2006 | Sabate et al. ................. 330/146 |
| 7,230,837 | B1 | * | 6/2007 | Huang et al. .................... 363/71 |

(Continued)

FOREIGN PATENT DOCUMENTS

| | | |
|---|---|---|
| EP | 1 852 962 A1 | 11/2007 |
| WO | WO 2008/132553 A2 | 11/2008 |

OTHER PUBLICATIONS

European Search Report for EP 09156258.7 dated Jun. 3, 2009.
(Continued)

*Primary Examiner* — Adi Amrany
(74) *Attorney, Agent, or Firm* — Buchanan Ingersoll & Rooney PC

(57) ABSTRACT

A method is disclosed for controlling single-phase DC/AC converters, along with a converter arrangement having at least two single-phase DC/AC converters. A controller is provided which can control the at least two single-phase DC/AC converters, and an isolation transformer, wherein outputs of the at least two single-phase DC/AC converters are cascade-connected with each other and an input of the isolation transformer. The controller is configured to control the at least two single-phase DC/AC converters to deliver power from their inputs to their outputs by turns.

17 Claims, 7 Drawing Sheets

(56) References Cited

U.S. PATENT DOCUMENTS

| | | | |
|---|---|---|---|
| 7,485,987 B2* | 2/2009 | Mori et al. | 307/63 |
| 7,518,886 B1* | 4/2009 | Lai et al. | 363/17 |
| 7,535,204 B1* | 5/2009 | Nadimpalli et al. | 323/222 |
| 7,710,752 B2* | 5/2010 | West | 363/71 |
| 7,719,865 B2* | 5/2010 | Iwata et al. | 363/71 |
| 7,782,031 B2* | 8/2010 | Qiu et al. | 323/272 |
| 7,808,125 B1* | 10/2010 | Sachdeva et al. | 307/82 |
| 7,830,687 B2* | 11/2010 | Du et al. | 363/71 |
| 7,893,346 B2* | 2/2011 | Nachamkin et al. | 136/244 |
| 8,031,495 B2* | 10/2011 | Sachdeva et al. | 363/71 |
| 8,089,785 B2* | 1/2012 | Rodriguez | 363/35 |
| 2005/0174813 A1 | 8/2005 | Dou et al. | |
| 2008/0143188 A1* | 6/2008 | Adest et al. | 307/82 |
| 2008/0192519 A1 | 8/2008 | Iwata et al. | |
| 2008/0298104 A1* | 12/2008 | Sachdeva et al. | 363/98 |
| 2009/0267527 A1* | 10/2009 | Facchini | 315/185 R |
| 2010/0156189 A1* | 6/2010 | Fishman | 307/77 |
| 2011/0267863 A1* | 11/2011 | Rigbers et al. | 363/132 |
| 2012/0007429 A1* | 1/2012 | Hantschel et al. | 307/71 |
| 2012/0026631 A1* | 2/2012 | Kazemi et al. | 361/42 |
| 2012/0072041 A1* | 3/2012 | Miller et al. | 700/292 |

OTHER PUBLICATIONS

O. Alonso et al., "Cascaded H-Bridge Multilevel Converter for Grid Connected Photovoltaic Generators with Independent Maximum Power Point Tracking of each Solar Array", IEEE, US, vol. 2, Jun. 15, 2003, pp. 731-735.

Bjorn Lindgren, "Topology for Decentralised Solar Energy Inverters with a Low Voltage AC-Bus", EPE '99, Lusanne, pp. 1-10.

* cited by examiner

METHOD FOR CONTROLLING SINGLE-PHASE DC/AC CONVERTERS AND CONVERTER ARRANGEMENT

RELATED APPLICATIONS

This application claims priority under 35 U.S.C. §119 to European Patent Application No. 09156258.7 filed in Europe on Mar. 26, 2009, the entire content of which is hereby incorporated by reference in its entirety.

FIELD

The disclosure relates to controlling single-phase DC/AC converters and to converter arrangements.

BACKGROUND INFORMATION

Isolated converters can be used for providing a galvanic isolation between the input and output of the converter. Such galvanic isolation may be desirable, for example, in photovoltaic (PV) applications where the DC voltage produced by photovoltaic panels is converted to AC voltage and fed to an AC supply network. The use of a non-isolated converter may cause a leakage current due to a stray capacitance of the photovoltaic module that could cause degradation especially in thin film photovoltaic modules. Also, the lack of isolation may compromise the safety of the equipment. In fact, national regulations in some countries specific a galvanic isolation between photovoltaic panels and the AC supply network.

The galvanic isolation may be implemented by using an isolation transformer in connection with the converter. Low frequency transformers can be bulky and heavy. A high frequency transformer can be used to make the system more compact and potentially less expensive. The use of a high frequency transformer in a converter involves the switching frequency of the converter supplying the transformer be high as well. In other words, slow switching speeds involve larger component values, and faster switching speeds enable the use of smaller less-expensive passive components (e.g. transformers, inductors and capacitors) in the converter.

However, while higher switching frequencies would be desirable, characteristics of switch components, such as IGBT (Insulated Gate Bipolar Transistor) and FET (Field Effect Transistor), may set limits to the switching frequencies that can be used. Also the switching losses can increase when the switching frequency is increased. As a result, an increase in the switching frequency of the converter may not be feasible or even possible beyond certain limits.

SUMMARY

A converter arrangement is disclosed. The converter arrangement comprises at least two single-phase DC/AC converters, and control means for controlling the at least two single-phase DC/AC converters. The control means are configured to control the at least two single-phase DC/AC converters to deliver power from their inputs to their outputs by turns. The converter arrangement also comprises an isolation transformer. Outputs of the at least two single-phase DC/AC converters are cascade-connected with each other and an input of the isolation transformer.

A method is also disclosed for controlling single-phase DC/AC converters in an arrangement having at least two single-phase DC/AC converters and an isolation transformer. The method comprises cascade-connecting outputs of the at least two single-phase DC/AC converters with each other and an input of the isolation transformer. The method also comprises controlling, in turns, each of the at least two single-phase DC/AC converters to deliver power from its input to its output in delivery periods such that each of the at least two single-phase DC/AC converters has one delivery period during a predetermined switching period. When a number of the at least two single-phase DC/AC converters is N, a length of one such delivery period is 100%/2N of the predetermined switching period, and starting times of two successive delivery periods by two different single-phase DC/AC converters are spaced by 100%/N of the predetermined switching period.

A computer program product is also disclosed. The computer program product is configured as a computer readable medium containing computer program code, wherein execution of the program code in a computer causes the computer to perform a method comprising: cascade-connecting outputs of the at least two single-phase DC/AC converters with each other and an input of the isolation transformer; and controlling, in turns, each of the at least two single-phase DC/AC converters to deliver power from its input to its output in delivery periods such that each of the at least two single-phase DC/AC converters has one delivery period during a predetermined switching period. When a number of the at least two single-phase DC/AC converters is N, a length of one such delivery period is 100%/2N of the predetermined switching period, and starting times of two successive delivery periods by two different single-phase DC/AC converters are spaced by 100%/N of the predetermined switching period.

A converter system is also disclosed. The converter system comprises: at least two single-phase DC/AC converters; a controller containing a computer program which configures the controller to control the at least two single-phase DC/AC converters to deliver power from their inputs to their outputs by turns; and an isolation transformer. Outputs of the at least two single-phase DC/AC converters are cascade-connected with each other and an input of the isolation transformer.

BRIEF DESCRIPTION OF THE DRAWINGS

In the following, the disclosure will be described in more detail in connection with exemplary embodiments with reference to the accompanying drawings, in which.

DETAILED DESCRIPTION

Exemplary embodiments are disclosed which include cascading outputs of two or more single-phase DC/AC converters with each other and an input of an isolation transformer and controlling the single-phase DC/AC converters to deliver power from their inputs to their outputs by turns (e.g., such that the single-phase DC/AC converters deliver power to the transformer one by one in successive turns).

According to exemplary embodiments, the equivalent frequency in the isolation transformer can be increased to a multiple of the switching frequency used in the single-phase DC/AC converters. In other words, the frequency in the transformer can be increased without increasing the switching frequency used in the individual DC/AC converters. The increase in the resulting frequency enables the size of the transformer and other such passive components to be reduced and, hence, their cost is also reduced. In addition, the overall converter volume can be decreased and efficiency improved. The disclosure can be used in connection with, for example, any application which utilizes DC/AC converters and an isolation transformer.

The application of the features disclosed herein is not limited to any specific system, but rather, features disclosed herein can be used in connection with any of various electric systems. Moreover, the use of the disclosure is not limited to systems employing any specific fundamental frequency or any specific voltage level. According to an exemplary embodiment of the disclosure, outputs of two or more single-phase DC/AC converters are cascade-connected with each other and an input of an isolation transformer.

Figure 1:
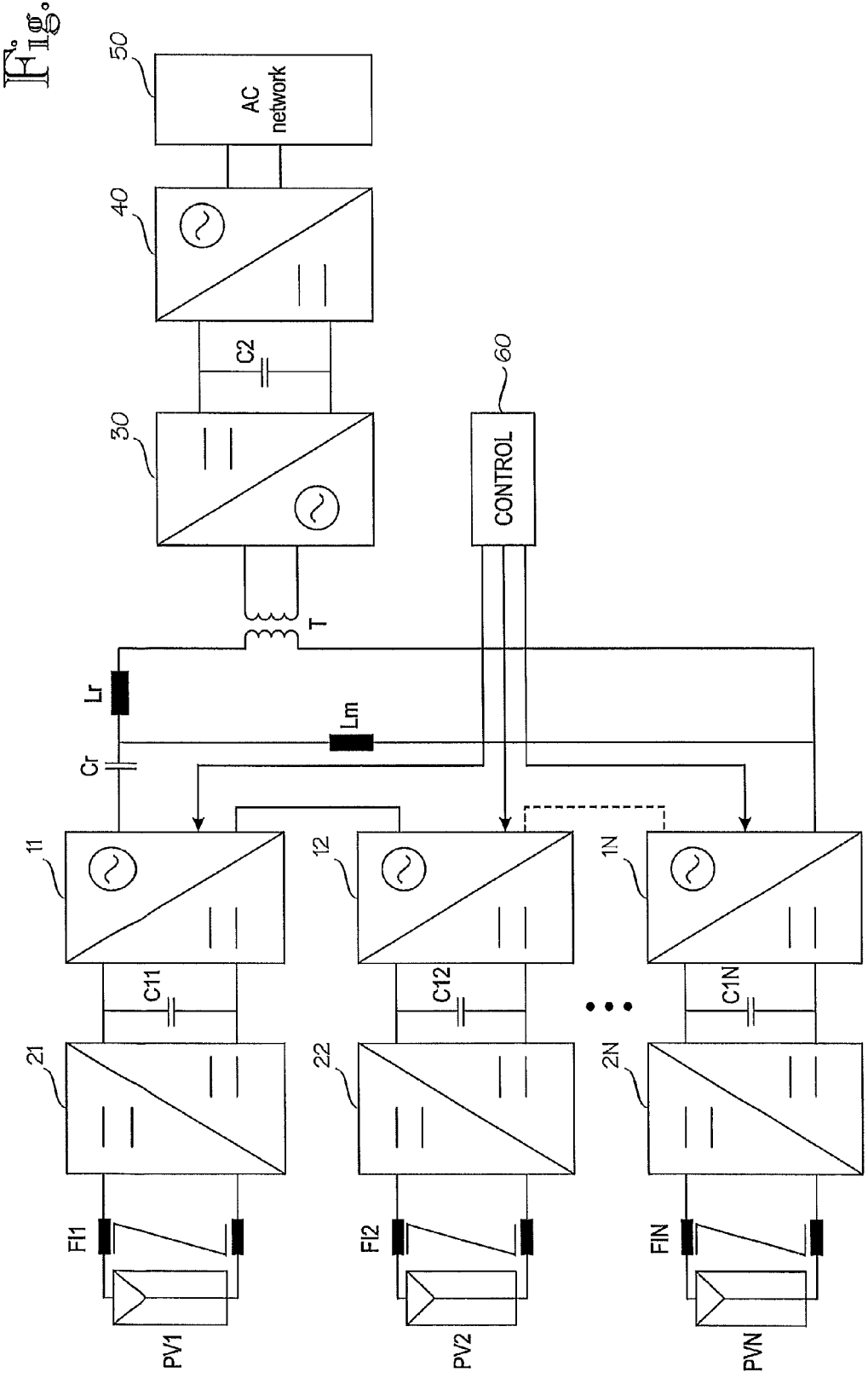
FIG. 1 illustrates a block diagram in accordance with an exemplary embodiment of the disclosure.

FIG. 1 illustrates a simplified block diagram of an exemplary converter arrangement according to some possible embodiments. The Figure shows only components necessary for understanding the disclosure.

The exemplary arrangement of FIG. 1 shows three connected DC/AC converters 11, 12 and 1N. The outputs of the DC/AC converters 11, 12 and 1N are cascaded (e.g., connected in series), with each other and the input of an isolation transformer T. 10. The isolation transformer T, as shown in the example of FIG. 1, may be further connected to other components such as an AC network 50 via an AC/AC converter. For example, a combination of an AC/DC converter 30 and a DC/AC converter 40, can be connected together by a DC link with a DC link capacitance C2. Such a connection to the AC network 50 may be a two-phase or three-phase connection although only a two-phase connection has been illustrated in the Figure. The supply to the single-phase DC/AC converters 11, 12 and 1N may come from any suitable power source. In the exemplary arrangement of FIG. 1, each of the single-phase DC/AC converters is supplied by one or more photovoltaic cells PV1, PV2 and PV3. The photovoltaic cells PV1, PV2 and PV3 are, for example, connected to the single-phase DC/AC converters 11, 12 and 1N via DC/DC converters 21, 22 and 2N, which are connected to the single-phase DC/AC converters by DC links with DC link capacitances C11, C12 and C1N. In an exemplary embodiment, input filters FI1, FI2 and FIN can be located between the photovoltaic cells PV1, PV2 and PV3 and the DC/DC converters 21, 22 and 2N.

According to an exemplary embodiment of the disclosure, the single-phase DC/AC converters 11, 12 and 1N are controlled to deliver power from their inputs to their outputs by taking turns (e.g., cyclically). The controlling of the DC/AC converters 11, 12 and 1N may be implemented by suitable control means 60, such as one or more control units or devices. According to an exemplary embodiment, each of the at least two single-phase DC/AC converters 11, 12 and 1N is controlled to deliver power from its input to its output in delivery periods such that each of the at least two single-phase DC/AC converters has one delivery period during a predetermined switching period, wherein, when the number of the at least two single-phase DC/AC converters is N, the length of one such delivery period is 100%/2N of the predetermined switching period and the starting times of two successive delivery periods by two different single-phase DC/AC converters are spaced by 100%/N of the predetermined switching period. In other words, during a given switching period each of the at least two single-phase DC/AC converters delivers power in its turn from its input to its output for one period whose length is 100%/2N of the switching period and the starting times of such periods by different single-phase DC/AC converters having successive turns are spaced by 100%/N of the predetermined switching period. Using such an exemplary embodiment, each of the at least two single-phase DC/AC converters has equal duty cycles. However, it is also possible that the single-phase DC/AC converters 11, 12 and 1N have unequal duty cycles (e.g., such that one converter has two delivery periods during the predetermined switching period while the other or others have only one).

Figure 6:
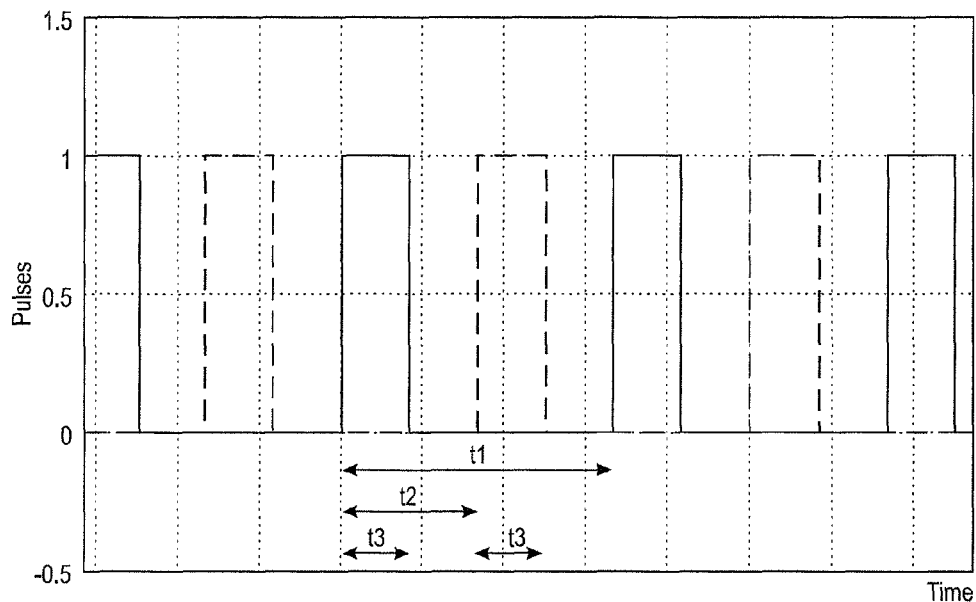
FIG. 6 illustrates a diagram of converter control pulses in accordance with an exemplary embodiment of the disclosure.

FIG. 6 illustrates a diagram showing converter control pulses in an exemplary arrangement having two single-phase DC/AC converters 11, 12, 1N. The control pulses of the first converter are drawn with a bold line and the control pulses of the second converter are drawn with a dashed line. In accordance with the above-described embodiment, when the predetermined switching period has a length t1, both the first and second converters have one delivery period during the switching period t1 such that the length of the delivery period t3 is 100%/2N of the switching period (that is, ¼*t1 since N=2). In addition, the delivery periods are spaced by period t2, which is 100%/N of the predetermined switching period (i.e., ½*t1 as illustrated). As a result of such an interleaved modulation of two cascade-connected converters, the current passing through the output poles of the converter, and hence the isolation transformer T, has N times the frequency (i.e. double when N=2) when compared to its voltage. For example, when the converters in case of two cascaded converters are each operating at 15 kHz, the resulting equivalent frequency inside the isolation transformer T is 30 kHz. In a similar manner, in case of three cascaded converters, each operating at a frequency of 15 kHz, the resulting equivalent frequency inside the isolation transformer T would be 45 kHz. It should be noted, however, that the disclosure is not limited to any particular frequency or frequencies but the operating frequencies of the cascaded converters can depend, for example, on the particular configuration used.

Figure 2:
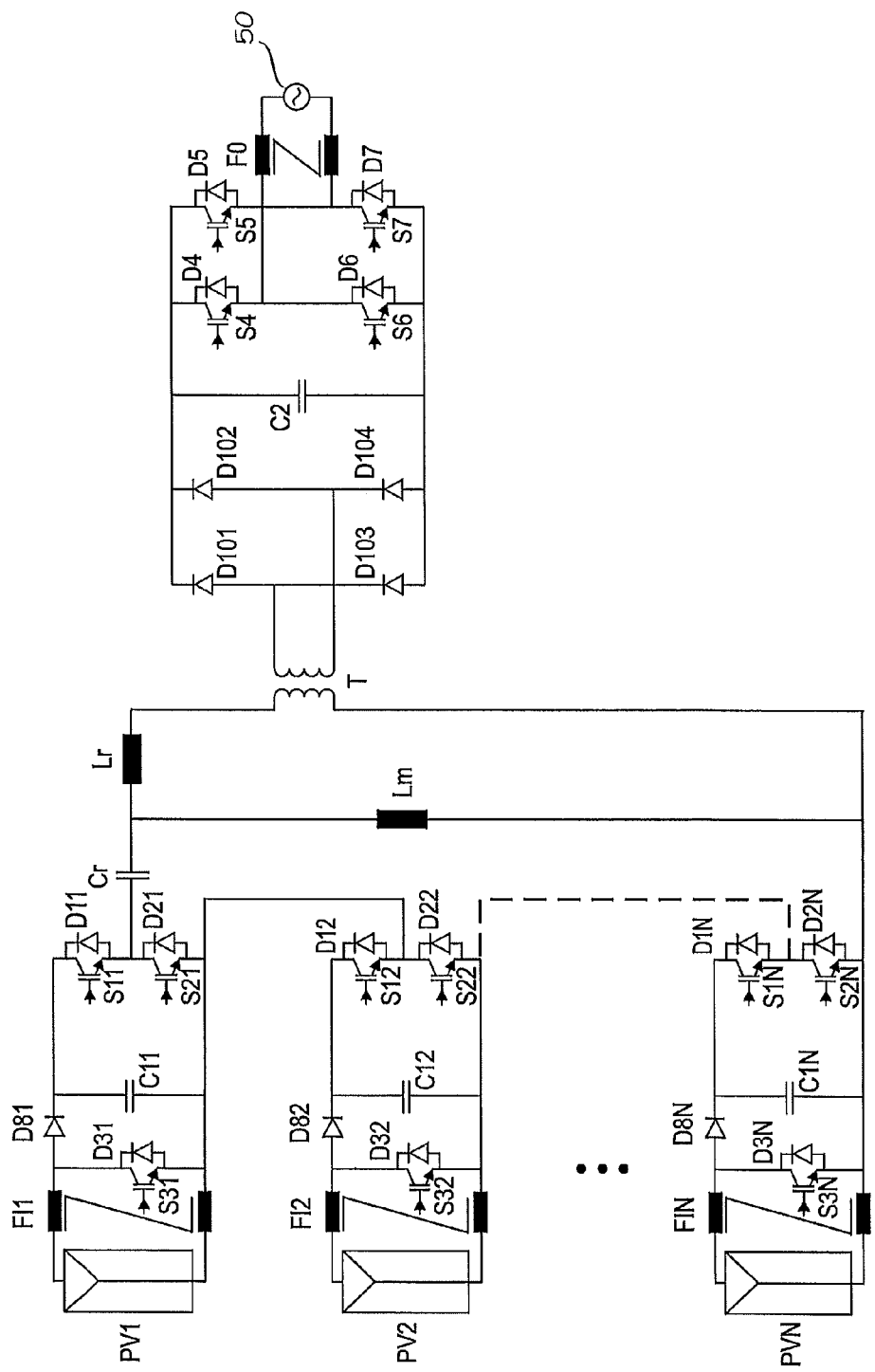
FIG. 2 illustrates a circuit diagram in accordance with an exemplary embodiment of the disclosure.

FIG. 2 illustrates a circuit diagram in accordance with an exemplary embodiment of the disclosure. The circuit diagram illustrates an example of how the arrangement of FIG. 1 may be implemented. The single-phase DC/AC converters 11, 12 and 1N may be implemented as half bridge inverters, each having a pair of controllable switches S11 and S21, S12 and S22, and S1N and S2N, respectively. The switches may be, for example, thyristors or transistors, such as IGBT or FET. The switches can, for example, have so-called reactive feedback diodes D11, D21, D12, D22, D1N and D2N connected in antiparallel with the switches S11, S21, S12, S22 and S1N, respectively. The output poles of each of the single-phase DC/AC converters in this configuration can be thus formed by a negative DC pole of the converter and the connection point of the two controllable switches of the converter.

Figure 7:
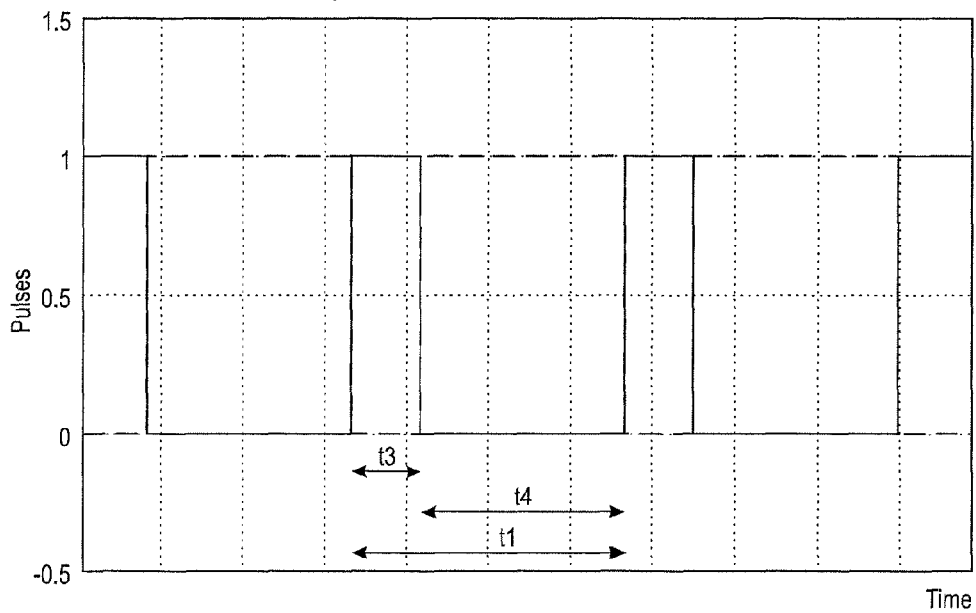
FIG. 7 illustrates a diagram of converter switch control pulses in accordance with an exemplary embodiment of the disclosure.

The controlling of the at least two single-phase DC/AC converters 11, 12 and 1N can be performed by controlling the switches. The control signals to the switches S11, S21, S12, S22 and S1N can, for example, come from the control means 60. For the sake of clarity, the connections between the control means 60 and the switches are not shown in FIG. 2. When each of the single-phase DC/AC converters 11, 12 and 1N includes a first switch S11, S12, S1N connected to a positive DC pole of the converter and a second switch S21, S22, S2N connected to a negative DC pole of the converter, the controlling of the switches, according to an exemplary embodiment, can be performed by controlling the first switch S11, S12, S1N of each of the at least two single-phase DC/AC converters 11, 12 and 1N to be conductive for the delivery period of the DC/AC converter it belongs to, and by controlling the second switch S21, S22, S2N of each of the at least two single-phase DC/AC converters to be conductive when the first switch S11, S12, S1N of the same DC/AC converter is not conductive. When, for example, converter 11 has its delivery period, switch S11 is controlled to be conductive by applying a suitable control pulse to its control input (i.e., a gate in the case of an IGBT or FET, for example). Outside the delivery period of converter 11, switch 21 is controlled to be conductive by applying a suitable control pulse to its control input. Thus, the second switch S21, S22, S2N of each converter 11, 12 and 1N is complementary commutated with respect to the first switch S11, S12, S1N of the same converter. This is illustrated in FIG. 7, which shows with a bold line the control pulses applied to the first switch and with a dashed line the control pulses applied to the corresponding second switch of the converter. In FIG. 7, the first switch is controlled to be conductive for the period of t3 during each given switching period t1 and the second switch is controlled to be conductive for the rest of the period (i.e., t1−t3=t4).

The optional DC/DC converters 21, 22 and 2N may be implemented as DC/DC boost converters, each having a switch S31, S32, S3N, a reactive feedback diode D31, D32, D3N and a diode D81, D82, D8N. The DC/AC converter 30 may be implemented as a single-phase bridge rectifier having four diodes D101, D102, D103 and D104. The DC/AC converter 40, in turn, may be implemented as a bridge inverter which, in the case of a two-phase output to the AC network 50, includes four switches S4, S5, S6 and S7, and for example, reactive feedback diodes D4, D5, D6 and D7 connected in antiparallel with the switches. In addition, the DC/AC converter 40 includes, for example, a suitable output filter FO. In the case of a three-phase output to the AC network 50, the DC/AC converter 40 can be implemented as a bridge inverter which includes six switches in three legs, for example.

According to an exemplary embodiment, the at least two single-phase DC/AC converters 21, 22 and 2N and the isolation transformer T operate in a resonant mode. Various resonant topologies can be used in order to achieve soft switching conditions for converter devices and, thus, a decrease in commutation losses. For example, the soft switching allows a reduction of semiconductor switching losses to almost zero due to ZVS (Zero Voltage Switching) and ZCS (Zero Current Switching) operation. The resonance phenomenon can be achieved by different configurations. Exemplary configurations include LC and LLC resonant tanks. The selection between the LC and LLC resonant tanks can, for example, depend on the converter design.

The resonance phenomenon can be utilized also in connection with the present disclosure. According to an exemplary embodiment, the at least two single-phase DC/AC converters are connected to the isolation transformer T via a resonant capacitance Cr in the form of one or more capacitors, as shown in FIGS. 1 and 2. In addition, the exemplary configuration of FIGS. 1 and 2 include inductances Lm and Lr, which together with the capacitance Cr form a "T" LLC circuit to implement the resonance. It should be noted that inductances Lm and Lr may be separate components (e.g., one or more inductors), or implemented as integrated in the leakage and magnetizing inductances of the isolation transformer T. The values of the resonant capacitance Cr and inductances Lm and Lr should be selected such that they are in resonance together. A detailed design of the resonant circuit, such as particular component values to be used, depends, for example, on the particular converter design and need not explained here in greater detail for the sake of brevity.

Figure 8:
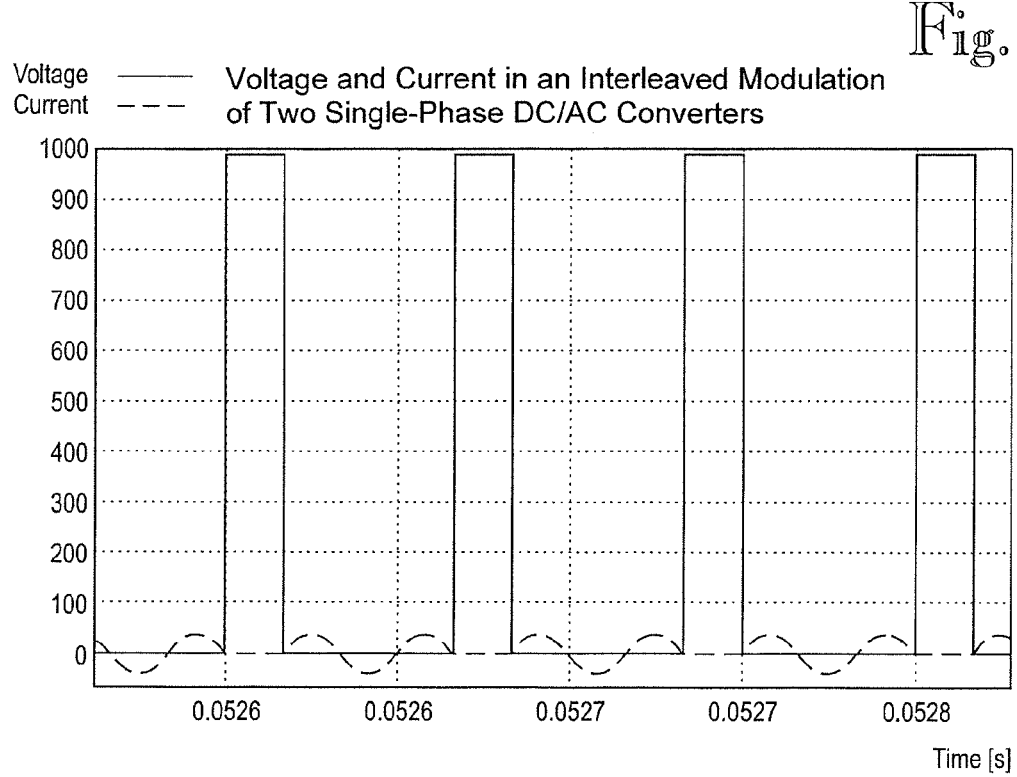
FIG. 8 illustrates voltage and current diagrams in accordance with an exemplary embodiment of the disclosure.

FIG. 8 illustrates a voltage (bold line) and current (dashed line) of switches S21 and S12 in an exemplary arrangement corresponding to the configuration of FIGS. 1 and 2, but including only two single-phase DC/AC converters 11 and 12. When the interleaved modulation is used as described above in connection with FIG. 6 or 7, the current passing through the switches S21 and S12, and hence the isolation transformer T, has double frequency when compared to the voltage as can be seen in the Figure.

Figure 3:
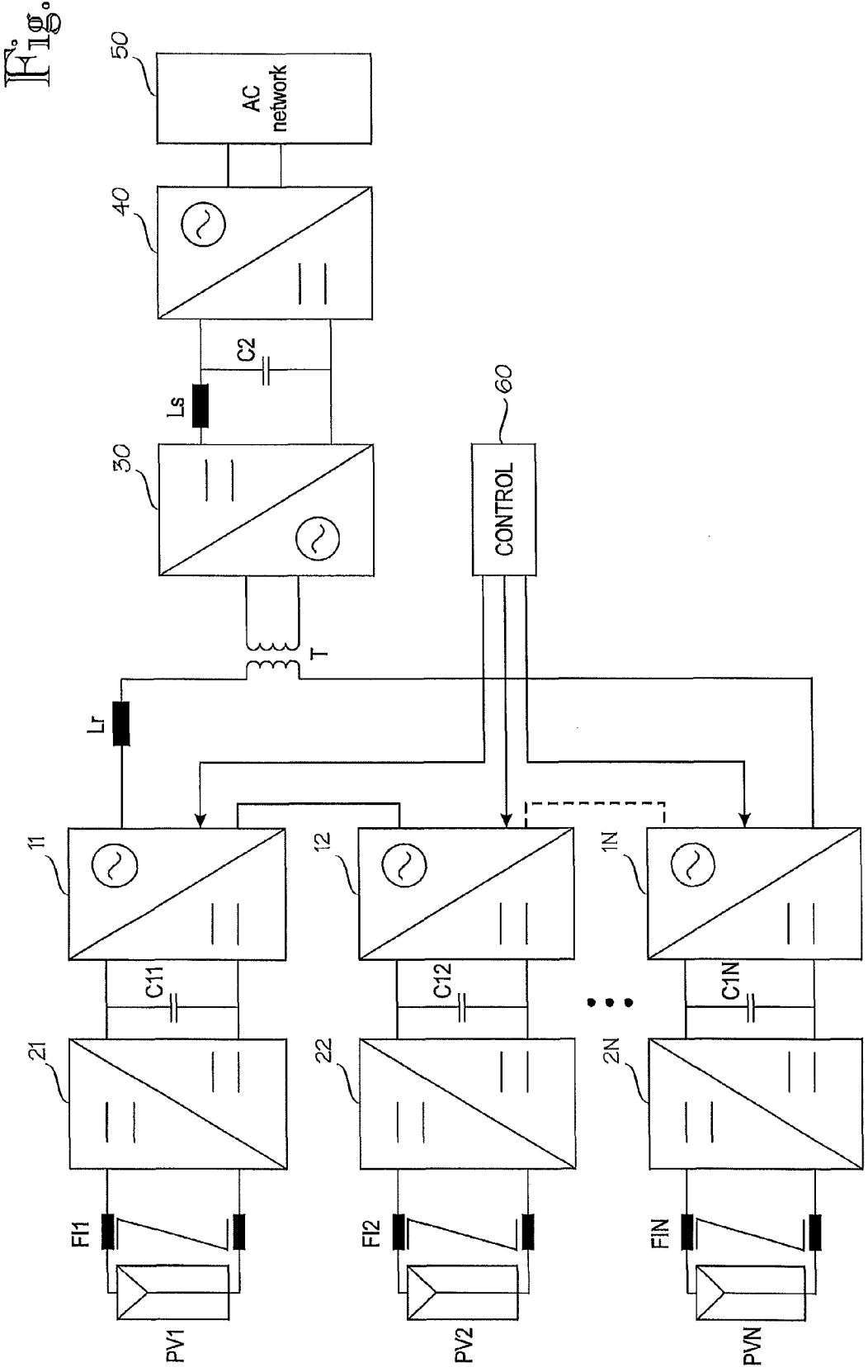
FIG. 3 illustrates a block diagram in accordance with an exemplary embodiment of the disclosure.

It is also possible to use the configuration of FIG. 1 without the resonant circuit and thus without the resonance phenomenon. FIG. 3 illustrates a block diagram of an exemplary converter arrangement which corresponds to that of FIG. 1 but which lacks the resonant capacitance Cr and inductance Lm and includes, for example, an additional inductor Ls on the secondary side of the arrangement in order to reduce current ripple on the output side and reduce commutation losses of the system during reverse recovery of the diodes. The arrangement of FIG. 3 can be otherwise implemented in a similar way to what is shown in the circuit diagram of FIG. 2. Without a resonant circuit the converters operate in a hard switching mode. The modulation technique to be used with the configuration of FIG. 3 can be the same interleaved modulation as described already above in connection with the configuration of FIGS. 1 and 2. Thus, the interleaved modulation disclosed herein can be used in connection with both resonant and non-resonant converters. As a consequence, the control means 60 can be the same for both a resonant and a non-resonant converter configuration.

Figure 9:
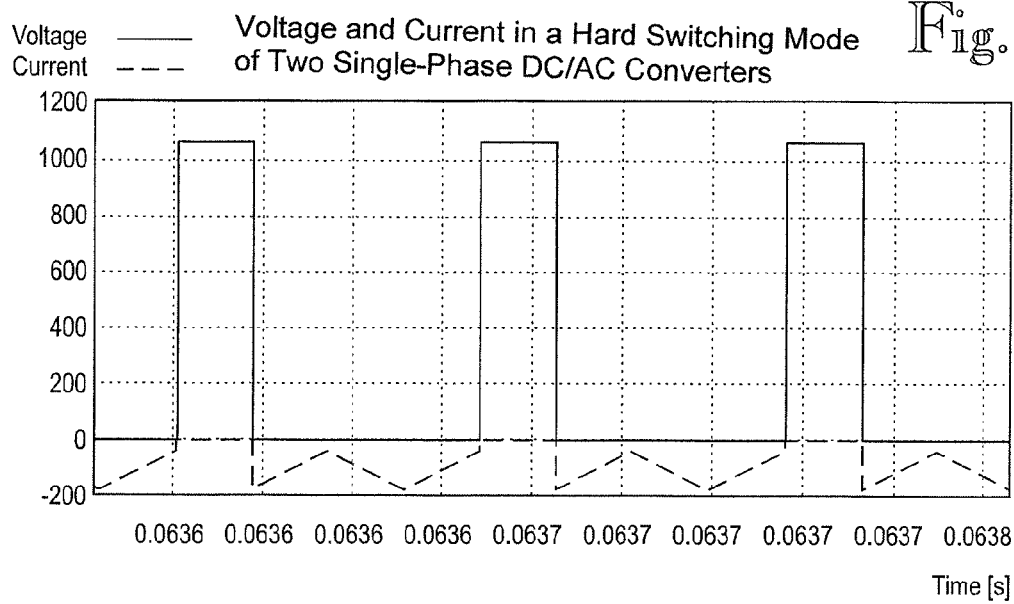
FIG. 9 illustrates voltage and current diagrams in accordance with an exemplary embodiment of the disclosure.

FIG. 9 illustrates a voltage (bold line) and current (dashed line) of switches S21 and S12 in an arrangement corresponding to the configuration of FIG. 3 but having only two single-phase DC/AC converters 11 and 12. As can be seen from FIG. 9, the operation in the hard switching mode results in different form of the current than in the soft switching mode but, nevertheless, the current passing through the output poles of the converter, and hence the isolation transformer T, has N times the frequency (i.e., double when N=2), when compared to the voltage.

Figure 4:
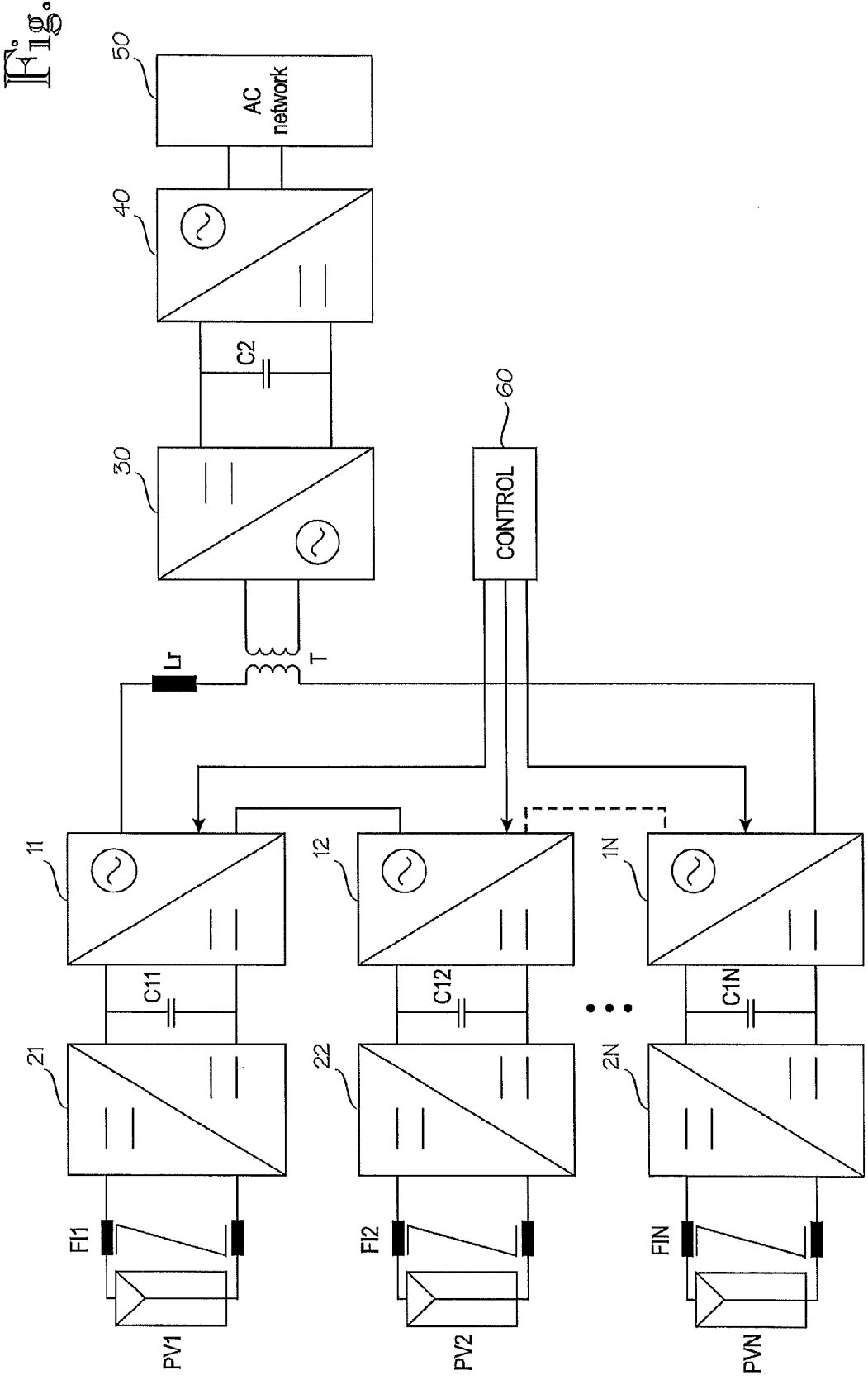
FIG. 4 illustrates a block diagram in accordance with an exemplary embodiment of the disclosure.
Figure 5:
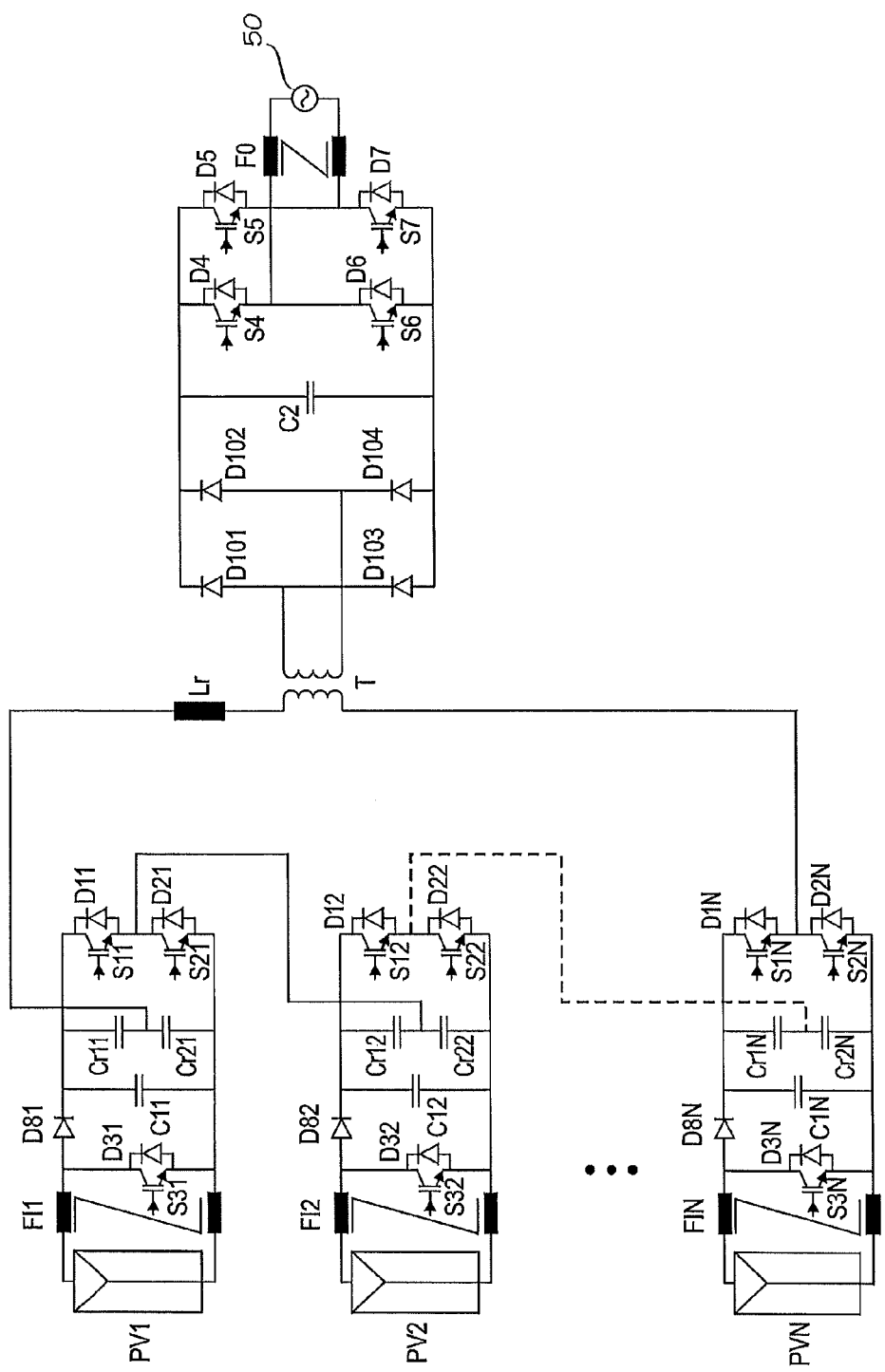
FIG. 5 illustrates a circuit diagram in accordance with an exemplary embodiment of the disclosure.

FIGS. 4 and 5 illustrate a block diagram and a circuit diagram of yet another exemplary configuration. In this alternative, the resonance phenomenon is caused by using in the single-phase DC/AC converters 11, 12 and 1N two capacitances Cr11 and Cr21, Cr12 and Cr22, and Cr1N and Cr2N, respectively, which are in resonance together with the resonant inductor Lr and the transformer T. Thus, the resonance phenomenon is introduced already at the level of the DC link. In the configuration of FIG. 5 the output poles of each of the at least two single-phase DC/AC converters are formed by the connection point of the two capacitances and the connection point of the two controllable switches of the converter. The modulation technique to be used with the configuration of FIGS. 4 and 5 is, for example, the same interleaved modulation as described already above in connection with the configuration of FIGS. 1 and 2. The voltage and current of switches S21 and S12 in an arrangement corresponding to the configuration of FIGS. 4 and 5 but including only two single-phase DC/AC converters 11 and 12 correspond to those illustrated in FIG. 8.

The control means 60 controlling the single-phase DC/AC converters 11, 12 and 1N according to any of the above embodiments disclosed herein, or a combination thereof, may be implemented as one unit or as two or more separate units that are configured to implement the functionality of the various embodiments. Here the term 'unit' refers generally to a physical or logical entity, such as a physical device or a part thereof or a software routine. The control means 60 according to any one of the embodiments may be implemented at least partly by means of one or more computers and/or corresponding digital signal processing (DSP) equipment provided with suitable software, for example. Such a computer or digital signal processing equipment can, for example, include at least a working memory (RAM) providing storage area for arithmetical operations and a central processing unit (CPU), such as a general-purpose digital signal processor. The CPU may comprise a set of registers, an arithmetic logic unit, and a control unit. The CPU control unit can be controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the disclosure, or a part thereof, may further include suitable input means for receiving information (e.g., measurement and/or control data), and output means for outputting information (e.g., control data). It is also possible to use a specific integrated circuit or circuits, or discrete electric components and devices for implementing the functionality according to any of the embodiments.

If at least part of the functionality of the disclosure is implemented by software, such software can be provided as a computer program product containing computer program code which, when run on a computer, causes the computer or corresponding arrangement to perform the functionality according to the disclosure as described above. Such a computer program code may be stored or generally embodied on a computer readable medium, such as suitable memory (e.g., a flash memory or an optical memory), from which it is loadable to the unit or units executing the program code. In addition, such a computer program code implementing the disclosure may be loaded to the unit or units executing the computer program code via a suitable data network, for example, and it may replace or update a possibly existing program code.

Those skilled in the art will appreciate that as technology advances, features disclosed herein can be implemented in a variety of ways. Consequently, the disclosure and its embodiments are not restricted to the above examples, but can vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A converter arrangement comprising:
   at least two single-phase DC/AC converters;
   control means for controlling the at least two single-phase DC/AC converters, the control means being configured to control the at least two single-phase DC/AC converters to deliver power from their inputs to their outputs by turns; and
   an isolation transformer,
   wherein outputs of said at least two single-phase DC/AC converters are cascade-connected with each other and an input of the isolation transformer.

2. The arrangement of claim 1, wherein the control means are configured to control each of the at least two single-phase DC/AC converters to deliver power from its input to its output in delivery periods such that each of the at least two single-phase DC/AC converters has one delivery period during a predetermined switching period
   wherein, when a number of the at least two single-phase DC/AC converters is N, a length of one such delivery period is 100%/2N of the predetermined switching period and starting times of two successive delivery periods by two different single-phase DC/AC converters are spaced by 100%/N of the predetermined switching period.

3. The arrangement of claim 2, wherein each of the at least two single-phase DC/AC converters comprises:
   a half bridge having two controllable switches, and the control means are configured to control the at least two single-phase DC/AC converters by controlling the switches.

4. The arrangement of claim 3, wherein the two controllable switches of each DC/AC converter comprise:
   a first switch connected to a positive DC pole of the DC/AC converter and a second switch connected to a negative DC pole of the DC/AC converter,
   wherein the control means are configured to control the first switch of each of the at least two single-phase DC/AC converter to be conductive for the delivery period of the DC/AC converter it belongs to, and to control the second switch of each of the at least two single-phase DC/AC converters to, be conductive when the first switch of the same DC/AC converter is not conductive.

5. The arrangement of claim 4, wherein two output poles of each of the at least two single-phase DC/AC converters are formed by a negative output of the DC/AC converter and a connection point of the two controllable switches.

6. The arrangement of claim 5, wherein the at least two single-phase DC/AC converters are connected to the isolation transformer via a resonant capacitance.

7. The arrangement of claim 4, wherein two output poles of each of the at least two single-phase DC/AC converters are formed by a connection point of two mutually series-connected capacitances, which are connected in parallel with the two controllable switches, and the connection point of the two controllable switches.

8. The arrangement of claim 7, wherein the two mutually series-connected capacitances are configured to operate as resonant capacitances.

9. The arrangement of claim 1, wherein the at least two single-phase DC/AC converters and the isolation transformer operate in a resonant mode.

10. The arrangement of claim 1, comprising: an AC/AC converter supplied by the isolation transformer.

11. The arrangement of claim 1, comprising: means for supplying each of the single-phase DC/AC converters by at least one photovoltaic cell.

12. The arrangement of claim 11, wherein the means for supplying the single-phase DC/AC converter by at least one photovoltaic cell comprises: a DC/DC converter.

13. A method for controlling single-phase DC/AC converters in an arrangement having at least two single-phase DC/AC converters and an isolation transformer, the method comprising:
- cascade-connecting outputs of said at least two single-phase DC/AC converters with each other and an input of the isolation transformer; and
- controlling, in turns, each of the at least two single-phase DC/AC converters to deliver power from its input to its output in delivery periods such that each of the at least two single-phase DC/AC converters has one delivery period during a predetermined switching period
- wherein, when a number of the at least two single-phase DC/AC converters is N, a length of one such delivery period is 100%/2N of the predetermined switching period and starting times of two successive delivery periods by two different single-phase DC/AC converters are spaced by 100%/N of the predetermined switching period.

14. The method of claim 13, wherein the at least two single-phase DC/AC converters each comprise:
- a half bridge having two controllable switches, wherein the controlling of the at least two single-phase DC/AC converters is performed by controlling the switches.

15. The method of claim 14, wherein the two controllable switches comprise a first switch connected to a positive DC pole of the converter and a second switch connected to a negative DC pole of the converter, and wherein the controlling of the switches comprises:
- controlling the first switch of each of the at least two single-phase DC/AC converters to be conductive for the delivery period of the DC/AC converter it belongs to; and
- controlling the second switch of each of the at least two single-phase DC/AC converters to be conductive when the first switch of the same DC/AC converter is not conductive.

16. A computer program product configured as a non-transitory computer readable medium containing computer program code, wherein execution of the program code in a computer causes the computer to perform a method comprising:
- controlling, in turns, each of the at least two single-phase DC/AC converters, the outputs of which are cascade-connected with each other and an input of an isolation transformer, to deliver power from its input to its output in delivery periods such that each of the at least two single-phase DC/AC converters has one delivery period during a predetermined switching period wherein, when a number of the at least two single-phase DC/AC converters is N, a length of one such delivery period is 100%/2N of the predetermined switching period and starting times of two successive delivery periods by two different single-phase DC/AC converters are spaced by 100%/N of the predetermined switching period.

17. A converter system comprising:
- at least two single-phase DC/AC converters; a controller configured to control the at least two single-phase DC/AC converters to deliver power from their inputs to their outputs by turns; and
- an isolation transformer,
- wherein outputs of said at least two single-phase DC/AC converters are cascade-connected with each other and an input of the isolation transformer.

* * * * *